US011896887B2

(12) United States Patent
Borneti

(10) Patent No.: US 11,896,887 B2
(45) Date of Patent: Feb. 13, 2024

(54) COOPERATION SYSTEM BETWEEN A WHEELCHAIR AND EXERCISERS

(71) Applicant: EVOWELL ITALY S.R.L., Pesche (IT)

(72) Inventor: Pierluigi Borneti, Pesche (IT)

(73) Assignee: EVOWELL ITALY S.R.L., Pesche (IT)

( * ) Notice: Subject to any disclaimer, the term of this patent is extended or adjusted under 35 U.S.C. 154(b) by 700 days.

(21) Appl. No.: 17/048,267

(22) PCT Filed: Apr. 16, 2019

(86) PCT No.: PCT/IB2019/053108
§ 371 (c)(1),
(2) Date: Oct. 16, 2020

(87) PCT Pub. No.: WO2019/202486
PCT Pub. Date: Oct. 24, 2019

(65) Prior Publication Data

US 2021/0101067 A1 Apr. 8, 2021

(30) Foreign Application Priority Data

Apr. 18, 2018 (IT) ........................ 102018000004667

(51) Int. Cl.
*A63B 71/00* (2006.01)
*A61G 5/10* (2006.01)
(Continued)

(52) U.S. Cl.
CPC ............ *A63B 71/0009* (2013.01); *A61G 5/10* (2013.01); *A63B 21/062* (2013.01); *A63B 21/078* (2013.01);
(Continued)

(58) Field of Classification Search
CPC . A63B 71/0009; A63B 21/062; A63B 21/078; A63B 23/1209; A63B 2022/0635;
(Continued)

(56) References Cited

U.S. PATENT DOCUMENTS 4,911,425 A * 3/1990 Kynast ............... A63B 71/0009
482/904
5,277,685 A 1/1994 Gonzales
(Continued)

FOREIGN PATENT DOCUMENTS

CN 104887421 A 9/2015
CN 107456353 A 12/2017
(Continued)

*Primary Examiner* — Andrew S Lo
(74) *Attorney, Agent, or Firm* — Volpe Koenig

(57) ABSTRACT

A cooperation system between a wheelchair and exercisers, allows both a control of the wheelchair's positioning and a locking thereof in a position for the gym exercise, the whole easily controllable by the user, without external aid, and on this regard it comprises: at least a magnetic hooking plate, fastened with respect to the exerciser with a predetermined spatial correlation; extensible magnetic means aboard a wheelchair, extending therefrom to said at least a hooking plate, by determining a mutual positioning between wheelchair and exerciser, suitable to perform exercises; and means for driving said extensible magnetic means aboard a wheelchair, which can be actuated by the wheelchair's user in seated position from an unlocking position to a locking position and vice versa.

9 Claims, 9 Drawing Sheets

(51) Int. Cl.
*A63B 21/062* (2006.01)
*A63B 21/078* (2006.01)
*A63B 23/12* (2006.01)
*A63B 22/06* (2006.01)

(52) U.S. Cl.
CPC ... *A63B 23/1209* (2013.01); *A63B 2022/0635* (2013.01); *A63B 2071/0018* (2013.01); *A63B 2209/08* (2013.01)

(58) Field of Classification Search
CPC ........ A63B 2071/0018; A63B 2209/08; A61G 5/10; A61G 3/0808
See application file for complete search history.

(56) References Cited

U.S. PATENT DOCUMENTS 5,362,297 A * 11/1994 Muir ...................... A63B 23/12 482/137
5,476,429 A * 12/1995 Bigelow ............ A63B 21/0056 482/904
5,643,143 A * 7/1997 Burak ................ A63B 71/0009 482/904
5,697,628 A * 12/1997 Spear ....................... A61G 5/12 297/487
5,704,876 A * 1/1998 Baatz ................. A63B 21/0052 482/61
5,709,631 A * 1/1998 Kleinsasser ........ A63B 71/0009 482/904
6,113,519 A * 9/2000 Goto .................. A63B 71/0009 482/54
6,645,127 B1 * 11/2003 Pestes ................ A63B 71/0009 482/904
7,004,885 B1 * 2/2006 Wu ........................ A63B 24/00 482/4
7,604,572 B2 * 10/2009 Stanford ............. A63B 21/225 482/904
7,874,962 B1 * 1/2011 Pestes .................... A63B 22/02 482/904
2007/0299371 A1 12/2007 Einav et al.
2009/0170672 A1 * 7/2009 McMullen ....... A63B 23/03525 482/129
2013/0217546 A1 * 8/2013 Heideman .......... A63B 21/4047 482/92

FOREIGN PATENT DOCUMENTS

JP 2002065802 A 3/2002
WO 2009126904 A2 10/2009
WO 2011047282 A2 4/2011
WO 2015079468 A1 6/2015

* cited by examiner

COOPERATION SYSTEM BETWEEN A WHEELCHAIR AND EXERCISERS

The present invention relates to a cooperation system between a wheelchair and exercisers, of the gym type, which can be used by people confined to a wheelchair.

As it is known, the awareness to guarantee to people having handicaps the occasions to practice sport and to take care of physical fitness has been increasing.

The fact of performing sporting activities and keeping satisfying physical conditions is at the basis of a newly found psycho-physical wellbeing which allows people suffering from a handicap to improve his/her own life style and found again trust in one's own means.

A difficulty which is particularly felt is that of being able to use, for a person without using legs and confined on a wheelchair, usual exercisers for muscle strengthening, of the type which can be commonly found in any gym.

Some system examples are known allowing the cooperation between a wheelchair and an exerciser.

For example, International patent application No. WO 2015/079,468 A1 describes an alignment system between a wheelchair and a gym exerciser, to guarantee their mutual correct positioning. US patent application No. US 2007/299,371 A1 describes a similar cooperation system applied to an apparatus for the rehabilitation of patients with motor problems.

International patent application No. WO 2011/047,282 A2 describes a particular exerciser which can be used even by people confined on a wheelchair, wherein a system for the mechanical fastening to rails for the wheelchair is described.

International application No. 2009/126,904 A2, on the contrary, describes a Lapis roulant which can be used in wheelchair, wherein mechanical sensors cooperate with a mechanical system to verify the asset of the wheelchair on the conveyor belt.

Chinese patent applications No. CN 107 456 353 A and No. CN 104 887 421 A and Japanese patent application No. JP 2002/065,802 describe additional fastening systems between wheelchairs.

The above-described systems help a user to determine his/her own position with respect to an exerciser, but they are complex to use, and at last they do not guarantee an optimum fastening of the wheelchair, but only a control of its correct position, to be re-examined in case of misalignment.

The technical problem underlying the present invention is to provide a cooperation system between a wheelchair and any exerciser allowing to obviate the drawback mentioned with reference to the known art.

Such problem is solved by a cooperation system as defined by the enclosed claim 1.

The main advantage of the cooperation system according to the present invention lies in the fact of allowing both a control in the positioning of the wheelchair and a locking thereof in a position for the gym exercise, the whole easily controllable by the user, without external aid.

The present invention will be described hereinafter according to a preferred embodiment example, provided by way of example and not with limitative purposes, with reference to the enclosed drawings wherein.

Figure 1:
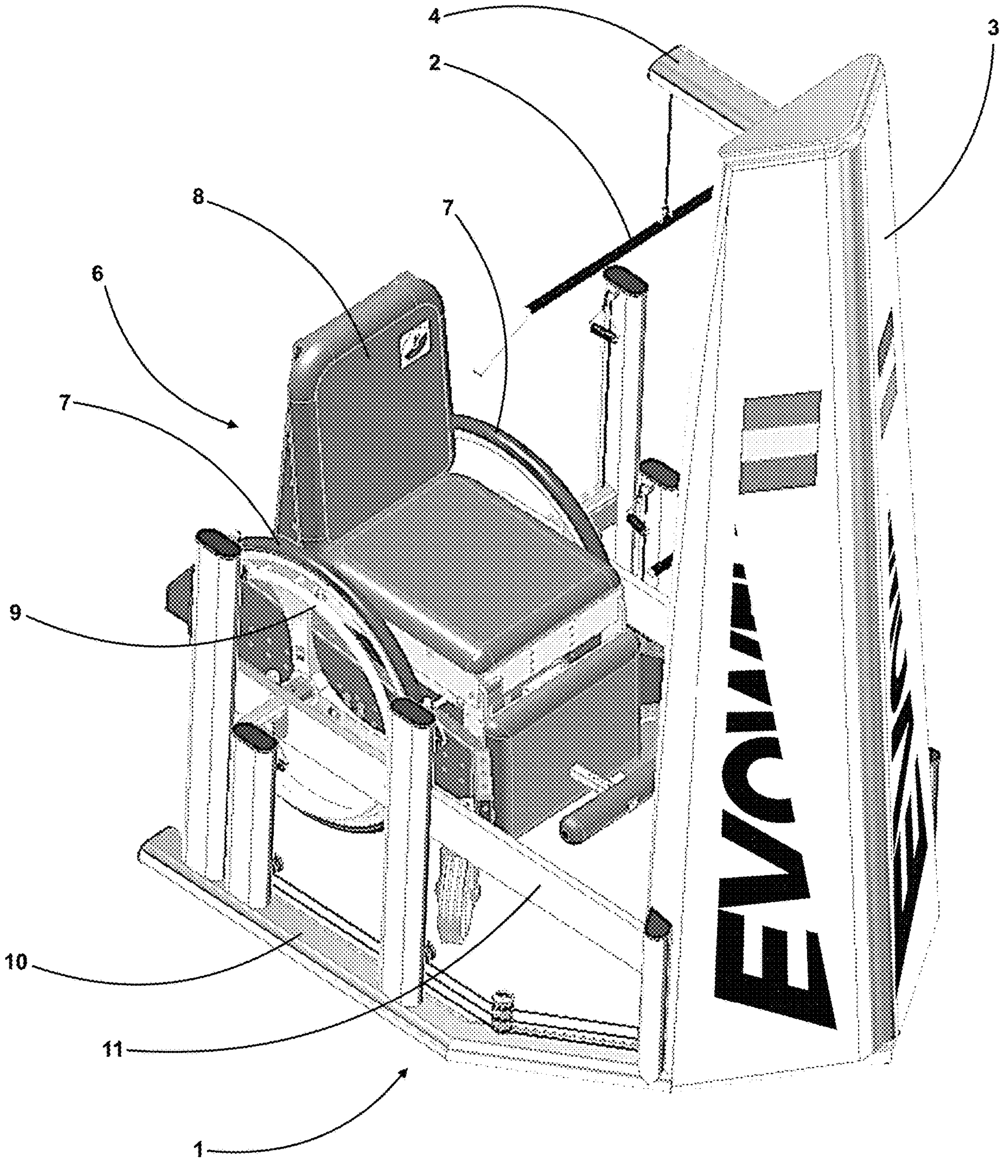
FIG. 1 shows a side perspective view of a LAT machine and of wheelchair incorporating a first cooperation system according to the invention.
Figure 2:
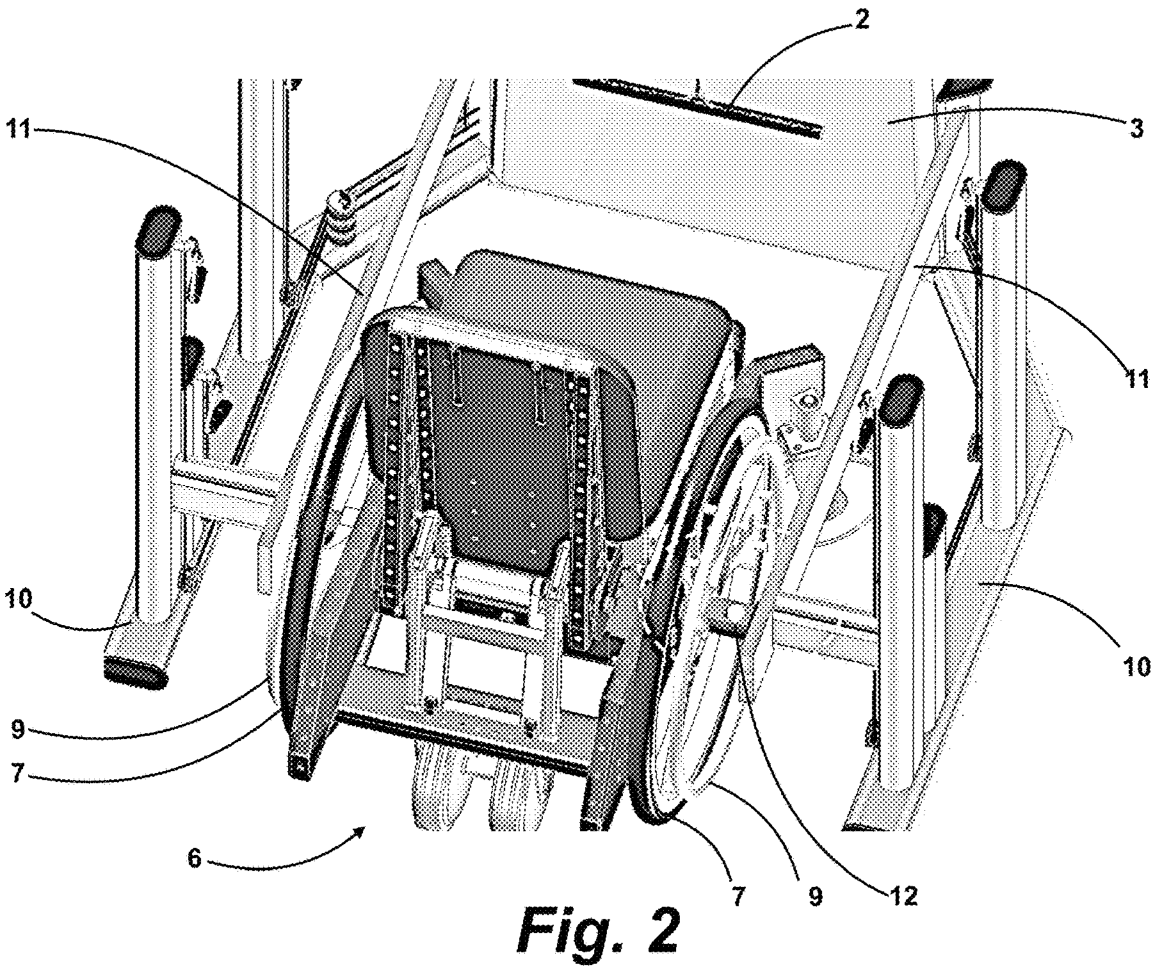
FIG. 2 shows a rear perspective view of a LAT machine and of a wheelchair incorporating the highlighted cooperation system of FIG. 1.
Figure 3:
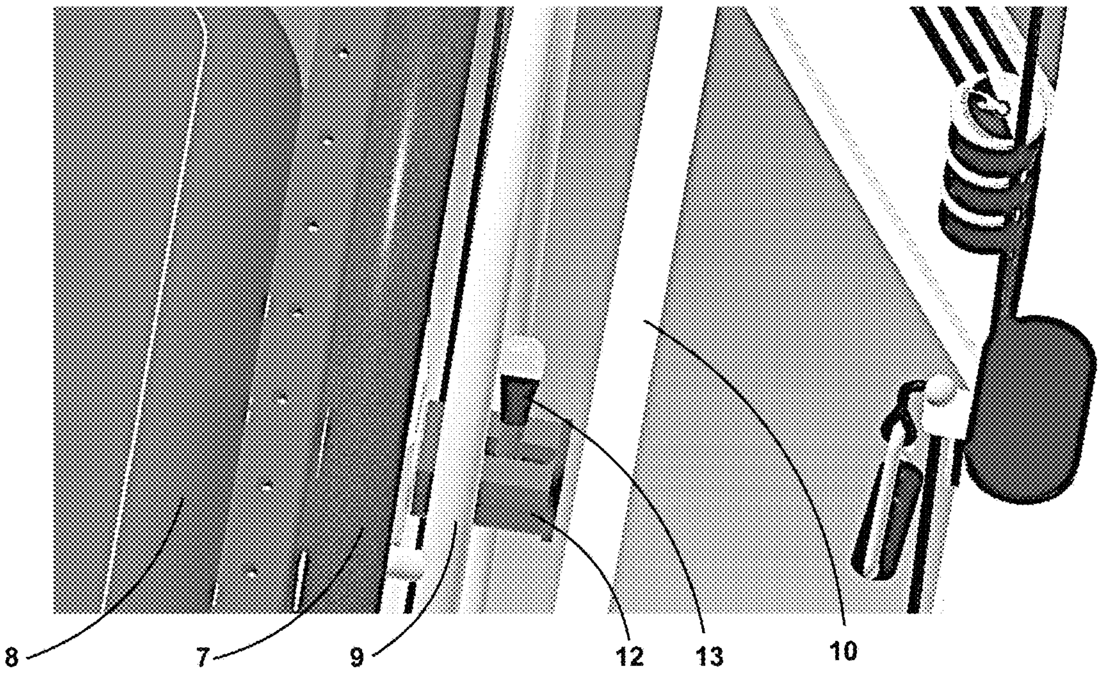
FIG. 3 shows an enlarged perspective view of the cooperation system of FIG. 1.

With reference to FIGS. 1 to 4, a so-called LAT machine designated with 1 is represented, that is an exercise machine to perform lifting exercises with an overhead handlebar 2, to the benefit of the large dorsal muscle.

Here, the LAT machine, called in this way from the muscle name (musculus latissimus dorsi) represents a general exerciser which can be actuated by a user in wheelchair. Hereinafter, each device suitable to this purpose will be generally designated with 1.

The LAT machine 1 comprises an upright 3 and a cross arm 4, with a pulley connected to the handlebar 2 for lifting one or more calibrated weights which can be selected by the user.

The LAT machine 1 further defines a position wherein a wheelchair 6, equipped with the herein described cooperation system, can be parked. It comprises wheels 7 and a seat 8, with a backrest with adjustable tilting.

The wheels 7 are of the type which can be maneuvered manually, thanks to a circular handle 9.

Herein and hereinafter, under wheelchair then a wheelchair, in particular a self-propelled wheelchair, is identified, which a user can use with a great level of autonomy.

In particular, the herein represented wheelchair represents an exerciser suitably created to assume several positions in the space through actuators, in particular electromechanical actuators which are fed by a rechargeable battery arranged aboard the wheelchair.

Said actuators allow the portions of the wheelchair to assume in the space several positions, that is the wheelchair allows the user to position in optimal way to perform the muscle exercise.

In particular, the following motions are provided:

motion of backrest from 0° to 90°, motion of the plate supporting the legs from 0° to 90°, oscillating motion of the seat placed under the thighs from 0° to 45°, motion from bottom to top of the whole structure, these four motions are controlled electrically by means of a button panel arranged on the side of the user.

The position in front of the LAT machine can be taken by the wheelchair, and it is defined by side frame elements 10, of the LAT machine 1, surrounding laterally said position.

Respective magnetic hooking plates 11 are fastened to the side frame elements 10, which in the present example have the shape of horizontal bars, one for each side of the above-mentioned position.

It is meant that there can be present, on each side, several bars having the function of magnetic hooking plate. Each one thereof can be made of ferromagnetic material, or have on its own surface directed towards the position a strip of magnetic material.

On each bar there can be indicators or pointers, or positioning notches.

The position of the plates 11 is so as to generate a predetermined spatial correlation with the exerciser, thanks to the size limits, referred in this case to the ends of the bars, which the plate 11 imposes.

At the hubs of the wheels 7, the wheelchair 6 comprises extensible magnetic means, received aboard the wheelchair 6, extending therefrom to said at least a hooking plate 10.

In the present example, such magnetic means is constituted by a magnet 12, existing on each hub of the wheel 7, which can be extended telescopically until reaching the side plate 10.

The extension of the magnet 12 until the magnetic contact, which implements a lock, with the plate 10 determines a mutual positioning between wheelchair and exerciser, which is limited to the extension of the bar which implements the fastening plate 10, and which is suitable to perform exercises with the LAT machine 1.

The magnet 12 can be driven by a control lever 13 which implements means for driving said extensible magnetic means aboard a wheelchair 6.

Each lever 13 is positioned so as to be able to be reached by the user on the wheelchair autonomously, by remaining in seated position; the lever 13 can control the magnet 12 from an unlocking position (FIG. 3) to a locking position (FIG. 2) and vice versa, by exerting a modest muscle force.

It is to be noted that the length of the side bars 11 define a standing area of the wheelchair 1 during the exercises, both it enters forward in the position of the machine 1, and it enters backward, thus allowing the user to carry out several types of exercises.

Figure 4:
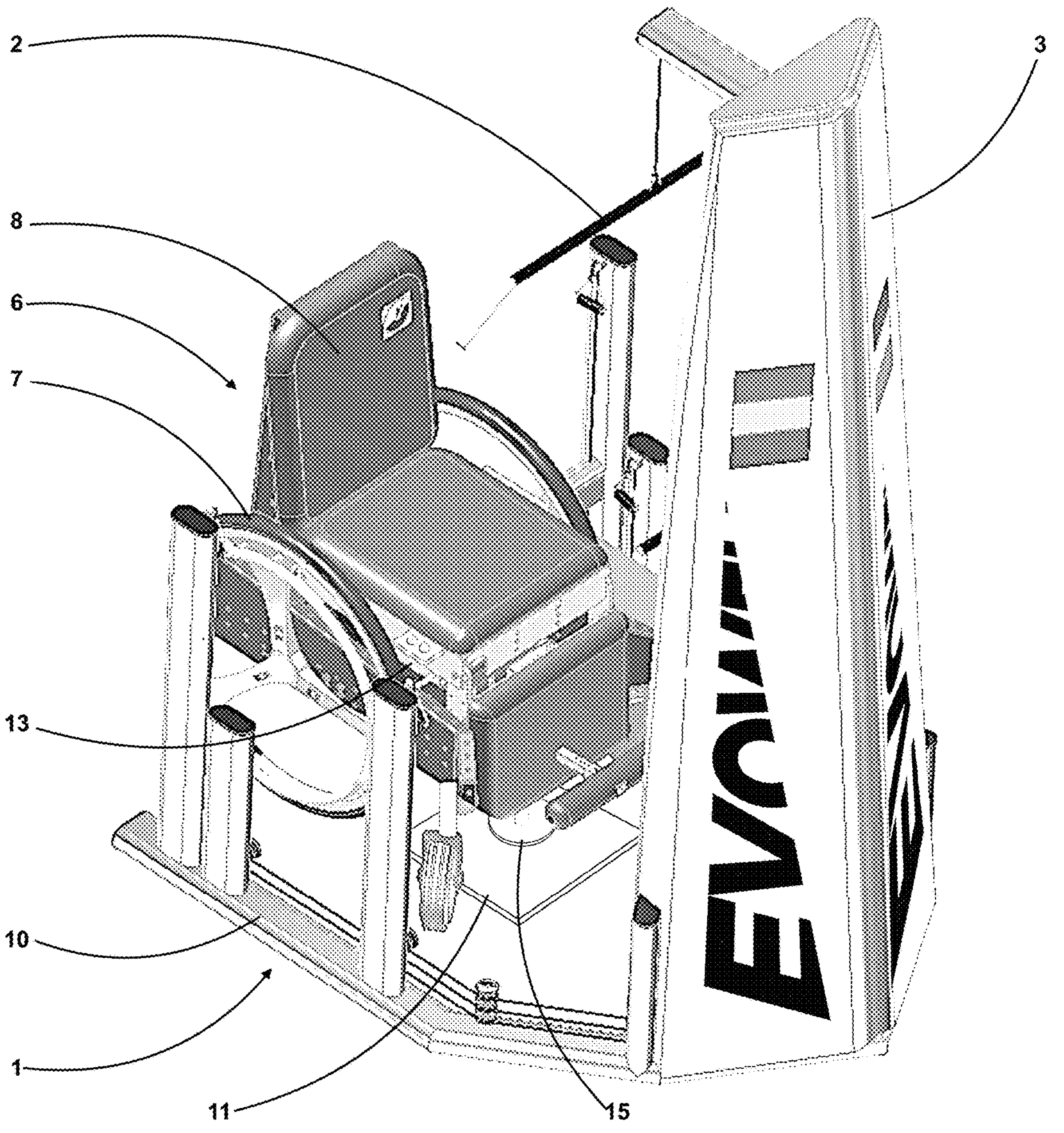
FIG. 4 shows a side perspective view of a LAT machine and of a wheelchair incorporating a second cooperation system according to the invention.
Figure 5:
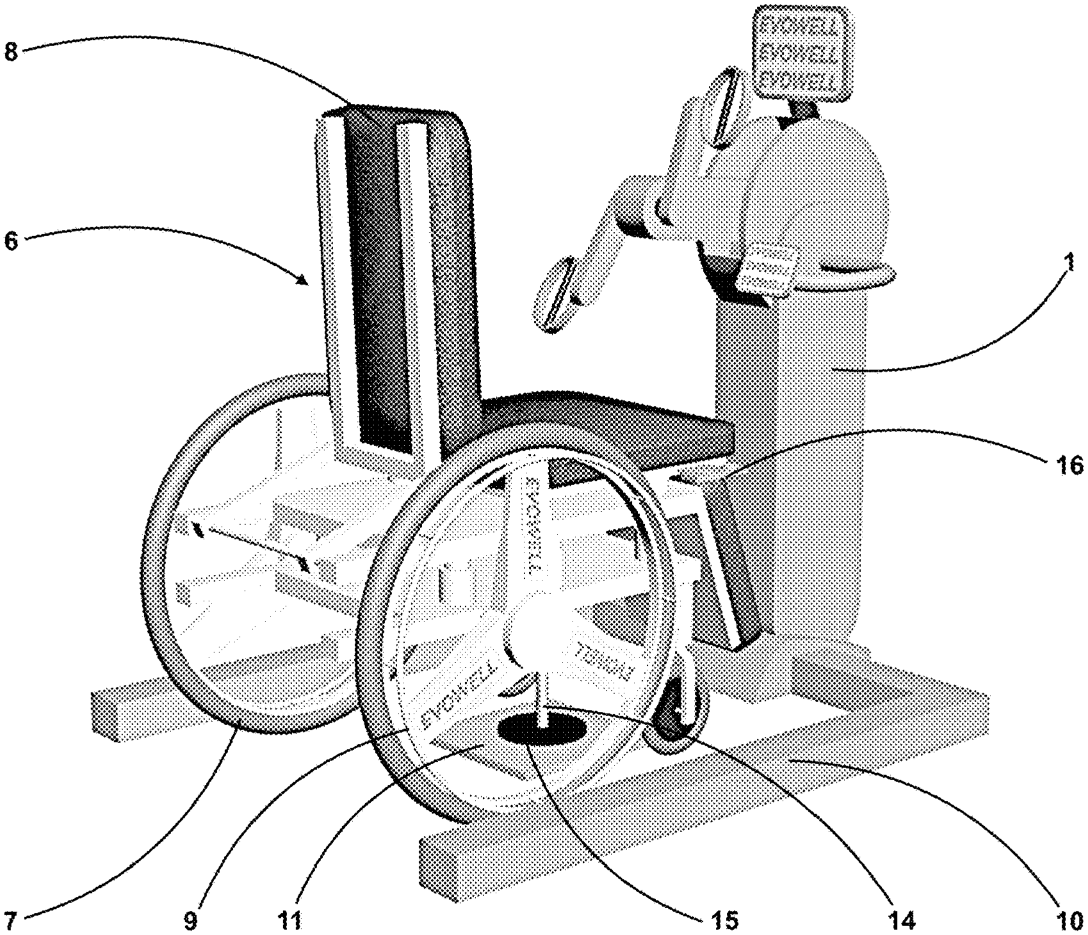
FIG. 5 shows a side perspective view of a pedal board for arms and of a wheelchair incorporating the second cooperation system of FIG. 4.
Figure 6:
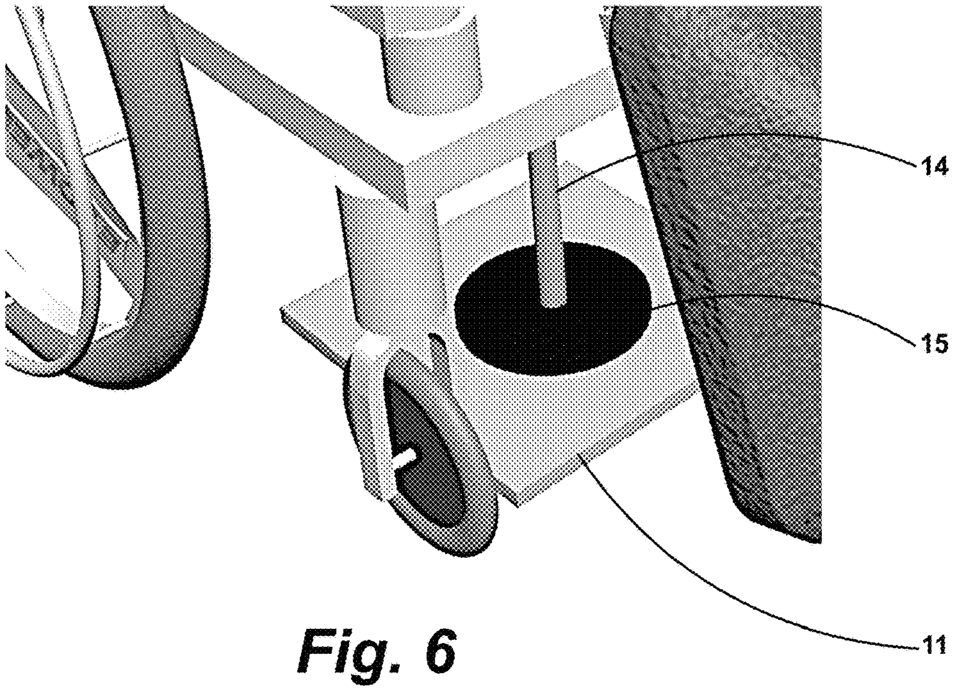
FIG. 6 shows an enlarged perspective view of the cooperation system of FIG. 4.

With reference to FIG. 4, the fastening plate 11 in this case is single and it is positioned on the floor of the position defined by the LAT machine. It is to be meant that the plate could be positioned on the floor supporting the exerciser, or otherwise the plate could be fastened to a footboard integral to the exerciser.

In the present example, the fastening plate 11 has a square shape, with a front side and a rear side defining a spatial correlation between it and the exerciser.

Again, the width of the fastening plate 11 defines a standing area of the wheelchair 1 during the exercises, both it enters forward in the position of the machine 1, and it enters backward, thus by allowing the user to carry out several types of exercises.

The wheelchair 6, at the bottom thereof, has an extensible arm 14 having, on the end thereof faced towards the floor, a magnetic plate 15 adhering to the fastening plate 11.

The extensible arm 14, and thus the magnetic plate, is controlled by a lever 13 positioned on the side of the wheelchair 6, still in a position accessible by the user.

In the herein described examples, the fastening plate is ferromagnetic, whereas aboard the wheelchair 6 there is a magnet or a magnetic plate, capable of adhering to the fastening plate 11 thanks to the effect of their magnetic properties induced by the presence of one or more permanent magnets.

It is meant, however, that the fastening can be of electromagnetic type; in this case the magnetic plate 15 is activated electromagnetically by an electric circuit fed by a battery aboard the wheelchair 6.

The extensible arm 14 can be controlled in extension and contraction by an electric motor arrange below the seat 8. Both the actuation of the arm 14 and the activation of the magnetic plate 15 can be controlled by a button panel 16 arranged on the side of the wheelchair 6, still in a position accessible by the user.

Figure 7:
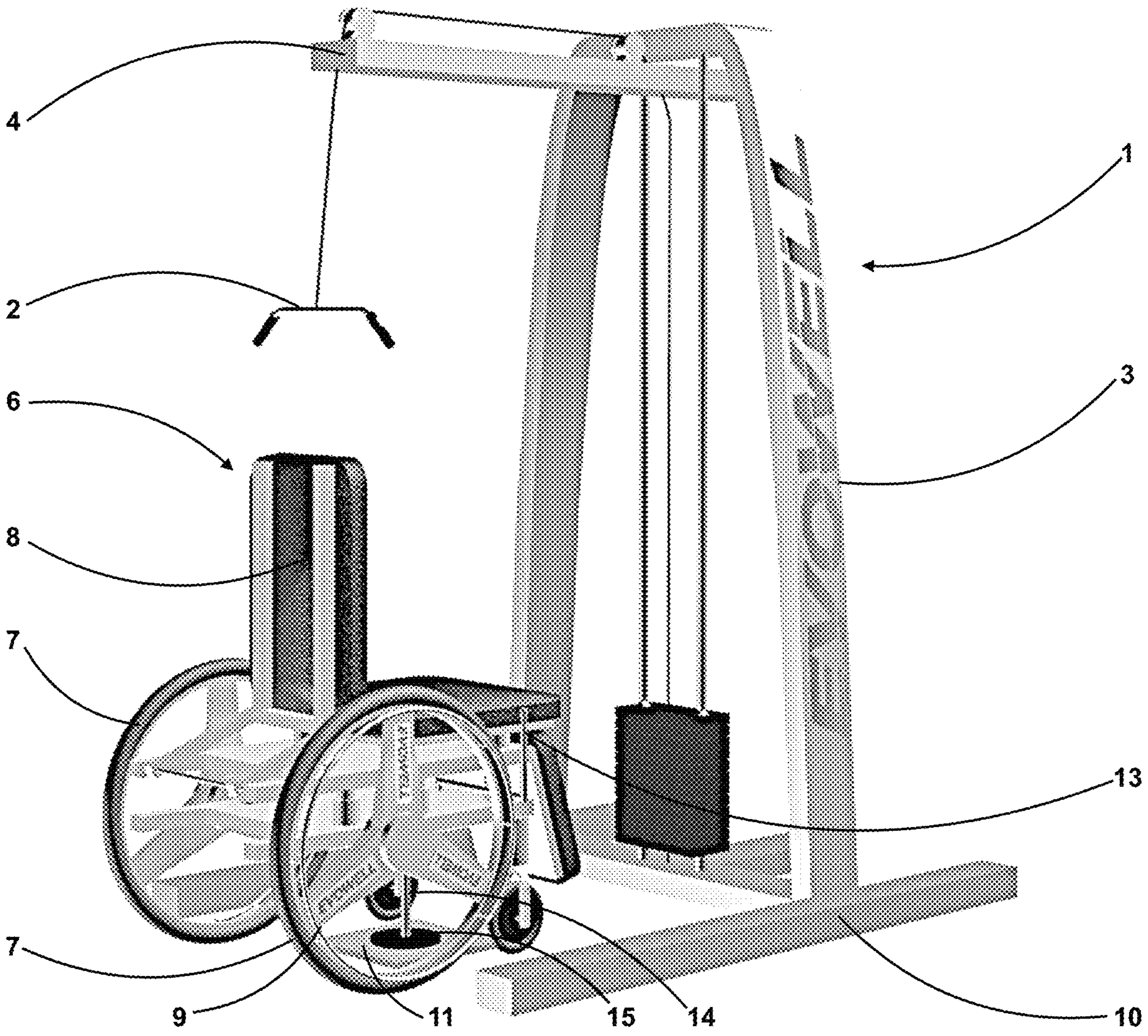
FIG. 7 shows a perspective view of another model of LAT machine and of a wheelchair with said second cooperation system.
Figure 9:
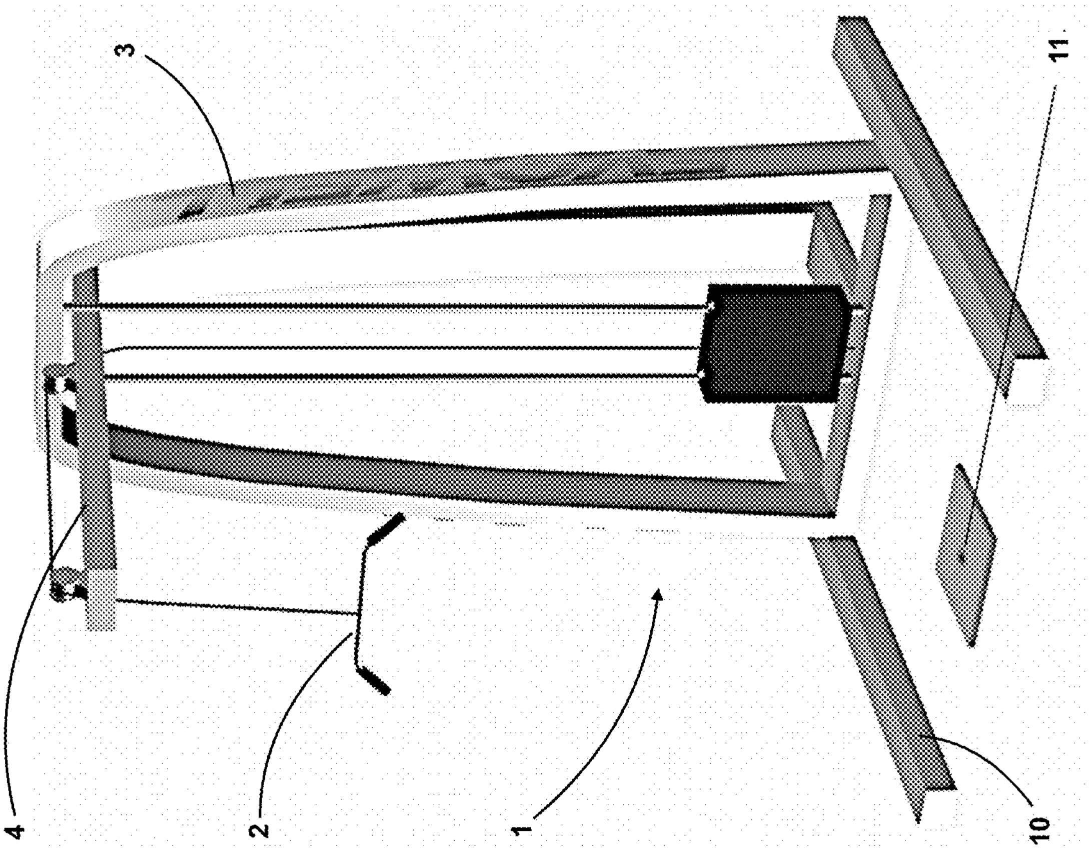
FIG. 8 and FIG. 9 show respective perspective views of LAT machine highlighting a different cooperation system according to the invention.
Figure 8:
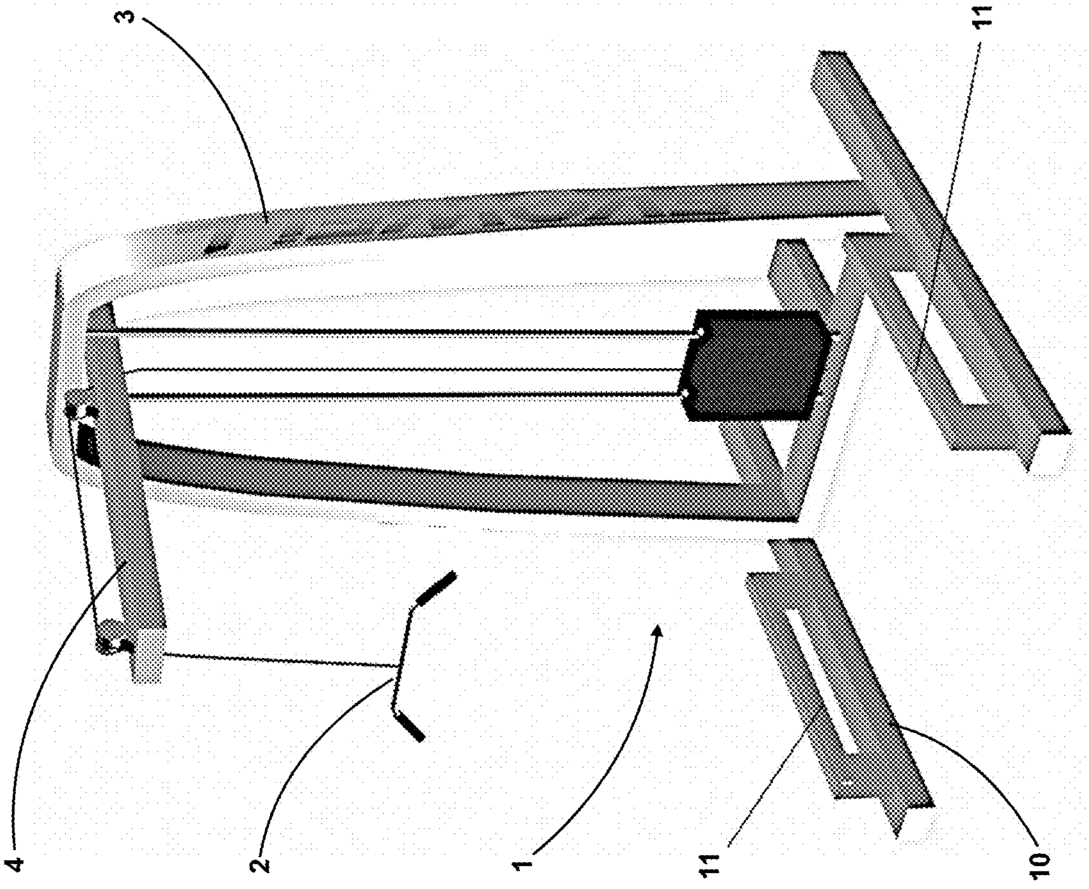
Figure 10:
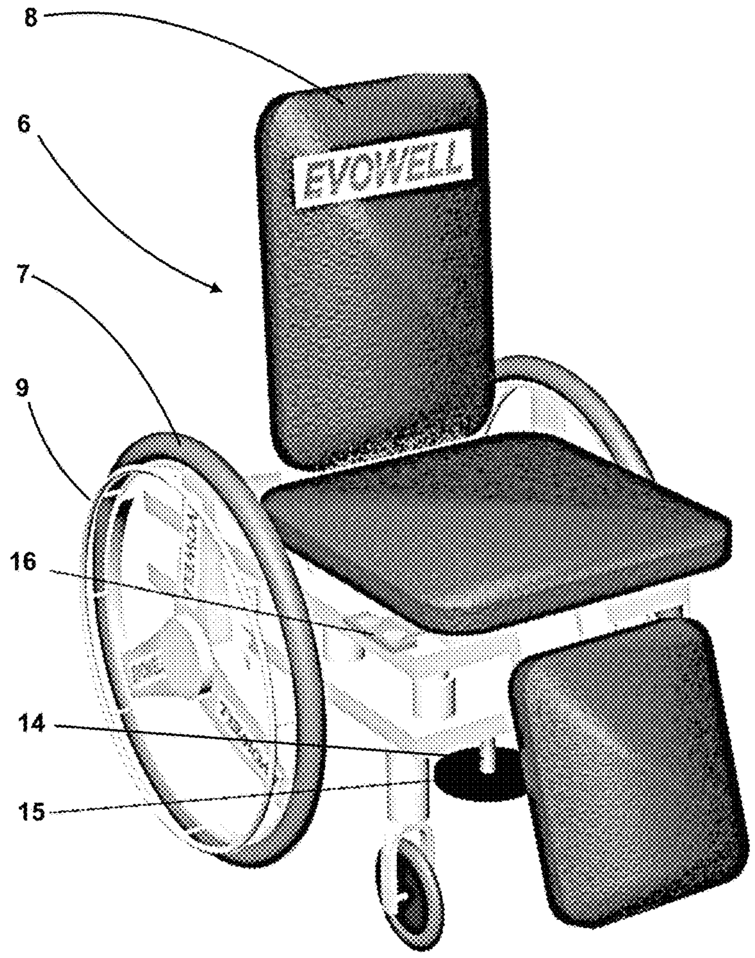
FIG. 10 shows a perspective view di una wheelchair highlighting a cooperation system according to the invention.

With reference to FIGS. 7 to 9 a LAT machine is shown both in the version with ground fastening plate (FIGS. 7 and 9) and in the version with side bars (FIG. 8).

It is known that, in both cases, a positioning area of the wheelchair 6 is defined implemented by the ends of the plate and of the fastening bars, beyond thereof the wheelchair cannot go, but within thereof the user can select its favoured position to perform the exercises with the exerciser.

It is further to be noted that, due to the effect of the side positioning of the bars and the central positioning of the fastening plate, the wheelchair 6 will be automatically centred with respect to the exerciser. It is to be meant that additional aids to the positioning could be added, if required, including optical control devices, with photoelectric cells and retro reflectors, or mechanical control devices, with insertion lanes, stopping notches or positioning recesses of the wheels 8 of the wheelchair.

Figure 11:
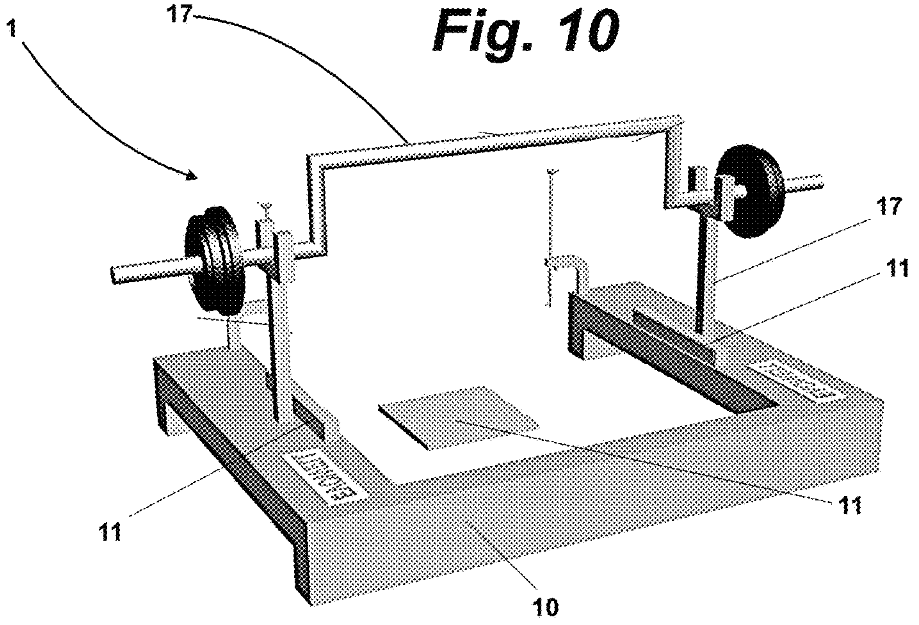
FIG. 11 shows a support for rocker arms highlighting a cooperation system according to the invention.

With reference to FIG. 11, an additional gym device, this time a simple support for rocker arms 17, can be provided both with side fastening bars and central fastening plate.

Figure 12:
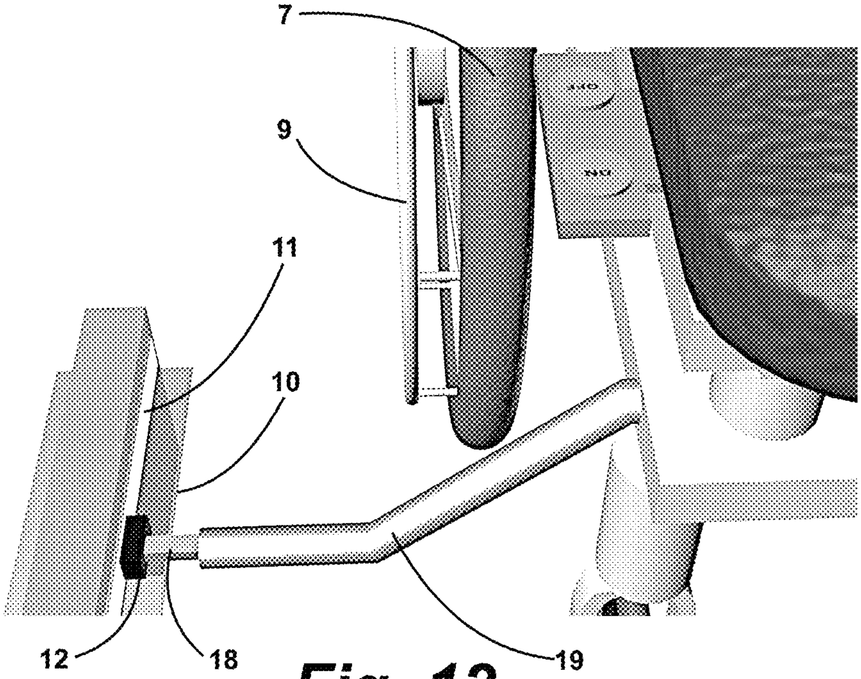
FIGS. 12 and 13 show respective enlarged perspective views of two variants of a third cooperation system according to the invention.
Figure 13:
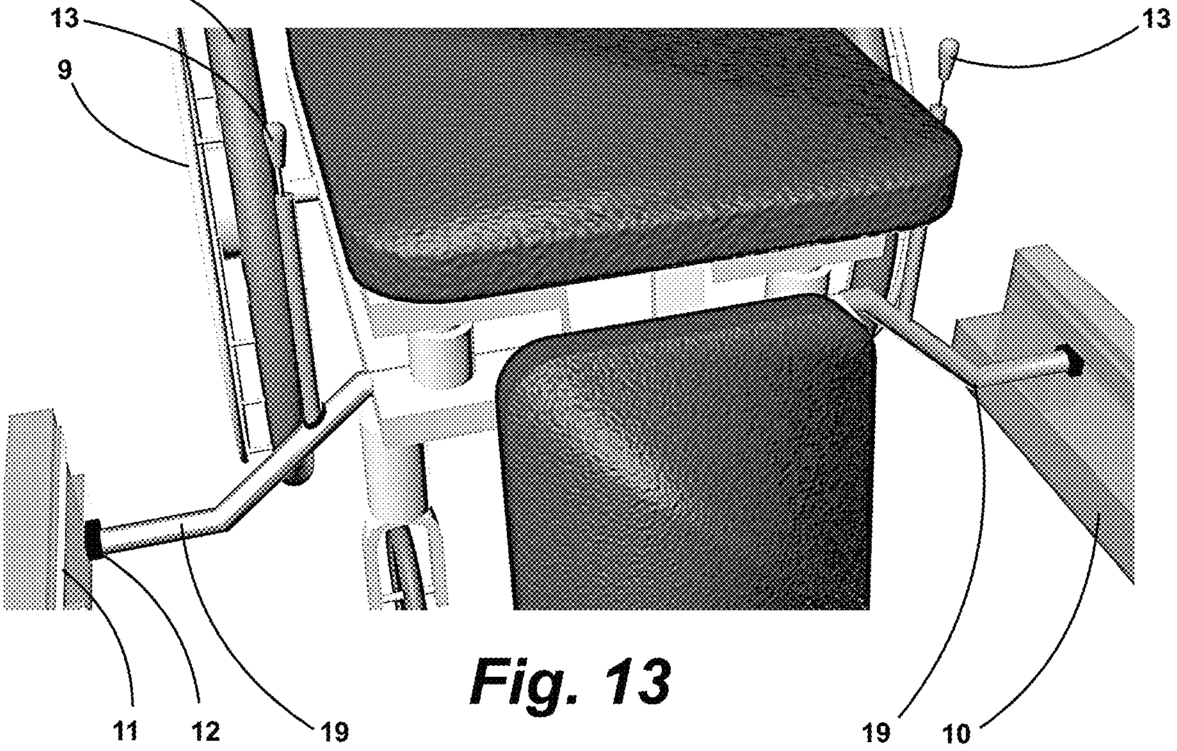

With reference to FIGS. 12 and 13, a magnetic version is shown with side extensible arm 18 projecting from the flank of the wheelchair 6. The extensible arm 18 herein is received in a tubular guide 19 and it is controlled in extension or contraction by a lever 13, arranged on the side of the wheelchair 6, still in a position accessible by the user.

This solution allows to adapt wheelchairs of small sizes to wide positions.

Figure 14:
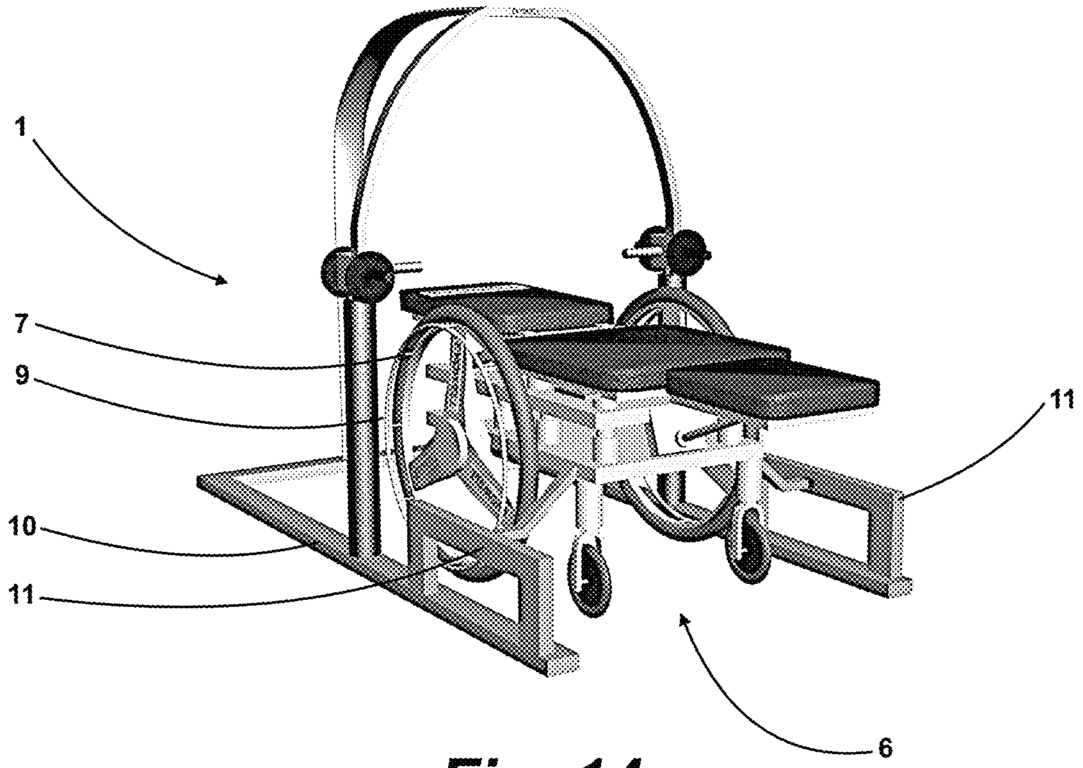
FIG. 14 and FIG. 15 show respective perspective views of additional exerciser with curved beams highlighting a different cooperation system according to the invention.
Figure 15:
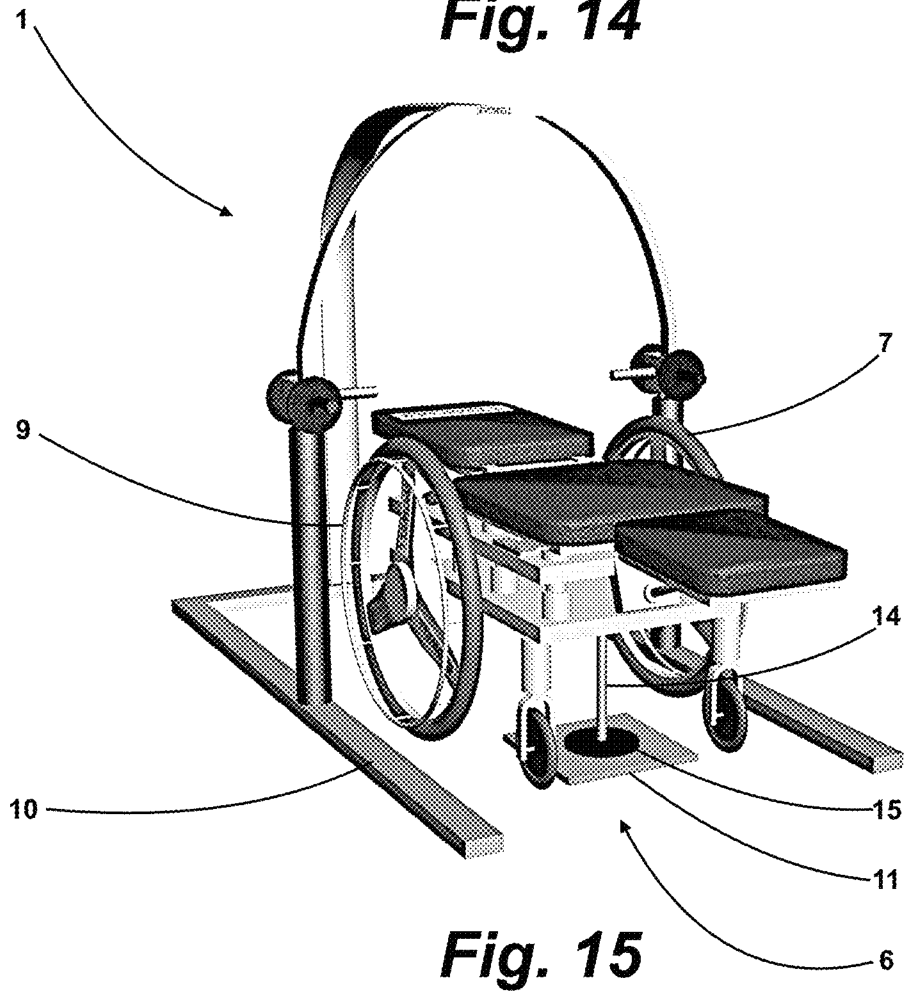

With reference to FIGS. 14 and 15, a different machine for the fitness is shown, which exploits the sliding of weights, pushed or pulled by the user, along arch-like curved beams, standing over the position wherein the wheelchair 6 positions. This machine with curved beams can have both the cooperation system with side bars and that with the plate for central fastening to floor.

To the above described cooperation system a person skilled in the art, with the purpose of satisfying additional and contingent needs, could introduce several additional modifications and variants, however all within the protective scope of the present invention, as defined by the enclosed claims.

The invention claimed is:

1. A cooperation system between a wheelchair and an exercise machine, comprising:

at least one magnetic hooking plate, fastened with respect to the exerciser with a predetermined spatial correlation;

a magnet and a respective extensible magnetic arm aboard a wheelchair, extending therefrom to said at least one magnetic hooking plate, by determining a mutual positioning between said wheelchair and said exercise machine; and a control lever aboard said wheelchair, for driving away said magnet, which can be actuated by a wheelchair's user in a seated position from an unlocking position to a locking position and vice versa.

2. The cooperation system according to claim 1, wherein the exercise machine defines a parking position of the wheelchair, defined by side frame elements surrounding laterally said position.

3. The cooperation system according to claim 2, wherein said at least one magnetic hooking plate comprises horizontal bars, one for each side of said position, fastened to the side elements, with ferromagnetic properties, having respective ends defining a positioning area of the wheelchair.

4. The cooperation system according to claim 2, wherein said at least one magnetic hooking plate comprises a square-shaped fastening plate, with a front side and a rear side defining a spatial correlation between it and the exerciser, positioned on a floor of said position or fastened to a footboard integral to the exercise machine.

5. The cooperation system according to claim 1, wherein said magnet is arranged laterally on the wheelchair and extensible laterally with respect thereto.

6. The cooperation system according to claim 1, wherein said extensible magnetic arm comprises an extensible arm having, on an end thereof faced towards a floor, a magnetic plate adhering to the fastening plate.

7. The cooperation system according to claim 1, wherein control lever is positioned so as to be able to be reached by a user on the wheelchair autonomously, by remaining in a seated position.

8. The cooperation system according to claim 1, said magnet and respective extensible magnetic arm comprise permanent magnets.

9. The cooperation system according to claim 1, wherein said magnet and respective extensible magnetic arm are electromagnetic, activated by an electric circuit fed by a battery aboard the wheelchair and controlled by a button panel arranged on a side of the wheelchair, in a position accessible by the user.

* * * * *